US011951639B2

(12) United States Patent
Ren et al.

(10) Patent No.: US 11,951,639 B2
(45) Date of Patent: Apr. 9, 2024

(54) INTERCONNECTING MEMBER AND HANDLE FOR RAZOR

(71) Applicant: WENZHOU MERS R&D LTD., Zhejiang (CN)

(72) Inventors: Chi Ren, Zhejiang (CN); Xiangrong Ren, Zhejiang (CN)

(73) Assignee: WENZHOU MERS R&D LTD., Wenzhou (CN)

( * ) Notice: Subject to any disclaimer, the term of this patent is extended or adjusted under 35 U.S.C. 154(b) by 449 days.

(21) Appl. No.: 17/298,625

(22) PCT Filed: Aug. 9, 2019

(86) PCT No.: PCT/CN2019/099937
§ 371 (c)(1),
(2) Date: May 31, 2021

(87) PCT Pub. No.: WO2021/026677
PCT Pub. Date: Feb. 18, 2021

(65) Prior Publication Data
US 2022/0009115 A1 Jan. 13, 2022

(51) Int. Cl.
*B26B 21/52* (2006.01)
*B26B 21/14* (2006.01)

(52) U.S. Cl.
CPC ............ *B26B 21/521* (2013.01); *B26B 21/14* (2013.01)

(58) Field of Classification Search
CPC ........ B26B 21/521; B26B 21/14; B26B 21/52
USPC .......................................... 30/532, 527, 530
See application file for complete search history.

(56) References Cited

U.S. PATENT DOCUMENTS 5,956,851 A * 9/1999 Apprille, Jr. ........ B26B 21/4062 30/526
10,105,858 B2 10/2018 Robertson
2010/0251555 A1* 10/2010 Park ...................... B26B 21/225 30/532
2015/0197017 A1* 7/2015 Lettenberger ......... B26B 21/225 30/526
2015/0273711 A1* 10/2015 Wang ....................... A61K 8/86 30/41
2018/0043551 A1 2/2018 Lu et al.

FOREIGN PATENT DOCUMENTS

CN 101462273 A 6/2009
CN 101612740 A 12/2009
CN 202702273 U 1/2013
CN 104385312 A 3/2015
CN 205058086 U 3/2016
CN 205817931 U 12/2016
(Continued)

*Primary Examiner* — Phong H Nguyen
(74) *Attorney, Agent, or Firm* — SHIMOKAJI IP

(57) ABSTRACT

An interconnecting member (10) for a razor comprises a housing (11), a pivoting support arm (12) and a resilient engaging arm (13). The housing (11) internally has a receiving cavity (111), the receiving cavity (111) penetrates through an upper end face (112) and a lower end face (113) of the housing (11); a free end (131) of the resilient engaging arm (13) is bent towards the rear of the housing (11) and is located in the receiving cavity (111), and the free end (131) of the resilient engaging arm (13) has an upper surface (1311), a lower surface (1312) and an inclined surface (1313).

8 Claims, 9 Drawing Sheets

(56) References Cited

FOREIGN PATENT DOCUMENTS

| | | | |
|---|---|---|---|
| CN | 207724359 | U | 8/2018 |
| EP | 2123410 | A1 | 11/2009 |
| EP | 3378610 | A1 | 9/2018 |
| EP | 3388210 | A1 | 10/2018 |

* cited by examiner

INTERCONNECTING MEMBER AND HANDLE FOR RAZOR

FIELD OF THE INVENTION

The present invention relates to the technical field of shaving, and more particularly to an interconnecting member and a handle for a razor.

BACKGROUND OF THE INVENTION

With development of the economy and the society, more and more abundant consumables are provided for people to enrich people's material live, and then improve people's living standards. Razors are one of these consumables.

At present, the existing razor can be mainly divided into an electric razor and a manual razor. For the manual razor, it cuts the beard by a razor head using the power provided by the user, so as to finish shaving. Therefore, compared with the electric razor, the manual razor is more environment-friendly and has an increasing share of the market.

A razor is disclosed in Chinese Patent No. 201310202899.0. An interconnect structure 30 has an engagement cavity 31 matched with the engagement portion 11 of the handle 10. The engagement cavity 31 has the same inclination as the engagement portion 11 . . . and the engagement cavity 31 is provided with an engagement member 112 connected with an operating member 40, one end of the engagement member 112 extends out of the engagement portion 11, . . . an inner wall of the engagement cavity 31 is opened with a engagement hole 32 engaged with the engagement member 112 (see the first paragraph on page 3 of the specification, and FIGS. 4 and 6). Thus, left and right ends of the engagement member 112 are engaged with the corresponding engagement hole 32 respectively, thereby engaging the interconnect structure 30 with the handle 10. Thus, the left end of the engagement member 112 is engaged with the left engagement hole 32 and the right end of the engagement member 112 is engaged with the right engagement hole 32, so as to realize the connection between the handle 10 and the interconnect structure 30. That is, the connection between the handle 10 and the interconnect structure 30 is realized by a multi-point engagement on the left and right sides, so the connection structure between the handle and the interconnect structure is complicated.

Therefore, there is an urgent need for an interconnecting member and a handle that are able to simplify the structure and mounting process and achieve single-point engagement to overcome the aforementioned deficiencies.

SUMMARY OF THE INVENTION

One objective of the present invention is to provide an interconnecting member for a razor which simplifies the structure and the mounting process and achieves stable fastening by single-point engagement.

Another objective of the present invention is to provide a handle for a razor which simplifies the structure and the mounting process and achieves stable fastening by single-point engagement.

To achieve the objective mentioned above, an interconnecting member for a razor includes a housing, pivoting support arms extending upwards from left and right sides of the housing respectively, and a resilient engaging arm extending upwards from a front side of the housing. The housing is provided with a receiving cavity therein, and the receiving cavity penetrates through an upper end face to a lower end face of the housing. A free end of the resilient engaging arm is bent towards a rear side of the housing and located in the receiving cavity, the free end of the resilient engaging arm has an upper surface, a lower surface, and an inclined surface connected between the upper surface and the lower surface and formed on a rear side of the free end, and the inclined surface is inclined forward from bottom to top of the free end.

Preferably, an intersection between the inclined surface and the lower surface and an intersection between the inclined surface and the upper surface are arc-shaped to realize a smooth transition.

Preferably, each of the upper and lower surfaces is an arcuate surface, and the arc diameter of the upper surface is greater than that of the lower surface.

Preferably, the housing is extended upward to from a left surrounding arm and a right surrounding arm, respectively. The left surrounding arm surrounds the receiving cavity on the left side of the housing, and the right surrounding arm surrounds the receiving cavity on the right side of the housing. The resilient engaging arm surrounds the receiving cavity on the front side of the housing and is spaced apart between the left surrounding arm and the right surrounding arm.

Preferably, the pivoting support arm on the left side of the housing is arranged on a left side of the left surrounding arm at intervals, and the pivoting support arm on the right side of the housing is arranged on a right side of the right surrounding arm at intervals.

To achieve the objective mentioned above, optionally, another interconnecting member for a razor includes a housing, pivoting support arms extending upwards from left and right sides of the housing respectively, and a resilient engaging arm extending upwards from a rear side of the housing. The housing is provided with a receiving cavity therein, and the receiving cavity penetrates through an upper end face to a lower end face of the housing. A free end of the resilient engaging arm is bent towards a front side of the housing and located in the receiving cavity. The free end of the resilient engaging arm has an upper surface, a lower surface, and an inclined surface connected between the upper surface and the lower surface and formed on a front side of the free end, and the inclined surface is inclined rearwards from bottom to top of the free end.

To achieve another objective mentioned above, a handle is provided for matching the aforesaid interconnecting member. The handle is provided with an inserting portion matched with the receiving cavity. The inserting portion is provided with an engaging groove, and a notch of the engaging groove is formed in a front surface and an upper surface of the inserting portion. A rear groove wall of the engaging groove is inclined forward from bottom to top of the handle and capable of abutting against the inclined surface. The intersection between the inclined surface and the lower surface is located in a space between the rear groove wall and a lower groove wall of the engaging groove.

Preferably, the rear groove wall of the engaging groove obliquely extends forward and upward to form a protruding pushing portion having the same, or increasing, or decreasing thickness.

Preferably, the rear groove wall and the lower groove wall of the engaging groove are both planes, the angle between the two planes is an acute angle, and a left groove wall and a right groove wall of the engaging groove are arranged obliquely from bottom to top of the handle and approach each other.

To achieve another objective mentioned above, optionally, a handle is provided for matching the aforesaid another interconnecting member. The handle is provided with an inserting portion matched with the receiving cavity. The inserting portion is provided with an engaging groove, and a notch of the engaging groove is formed in a rear surface and an upper surface of the inserting portion. A front groove wall of the engaging groove is inclined rearwards from bottom to top of the handle and capable of abutting against the inclined surface. The intersection between the inclined surface and the lower surface is located in a space between the front groove wall and a lower groove wall of the engaging groove.

In comparison with the prior art, the resilient engaging arm is extended upward from the front side of the housing, the free end of the resilient engaging arm is bent toward the rear side of the housing and located in the receiving cavity. Furthermore, the free end of the resilient engaging arm has the upper surface, the lower surface, and the inclined surface connected between the upper surface and the lower surface and formed on the rear side of the free end, and the inclined surface is inclined forward from bottom to top of the free end. Therefore, while the inserting portion of the handle is inserted into the receiving cavity, the inserting portion pushes the free end of the resilient engaging arm to resiliently deform towards the front side of the housing, so that the inserting portion smoothly passes over the intersection of the inclined surface and the lower surface and is in surface-to-surface contact with the inclined surface. As a result, the inserting portion is reliably clamped between the inclined surface and the corresponding cavity wall of the receiving cavity, and the inclined surface of the free end is in surface-to-surface contact with the inserting portion. Therefore, the interconnecting member is connected to the handle by means of one resilient engaging arm extending from one side of the housing. Consequently, the razor can simplify the structure, and the single-point engagement between the handle and the interconnecting member can be realized under the premise of ensuring the reliable engagement of the handle and the interconnecting member.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

A distinct and full description of the technical solution of the present invention will follow by combining with the accompanying drawings.

Figure 1:
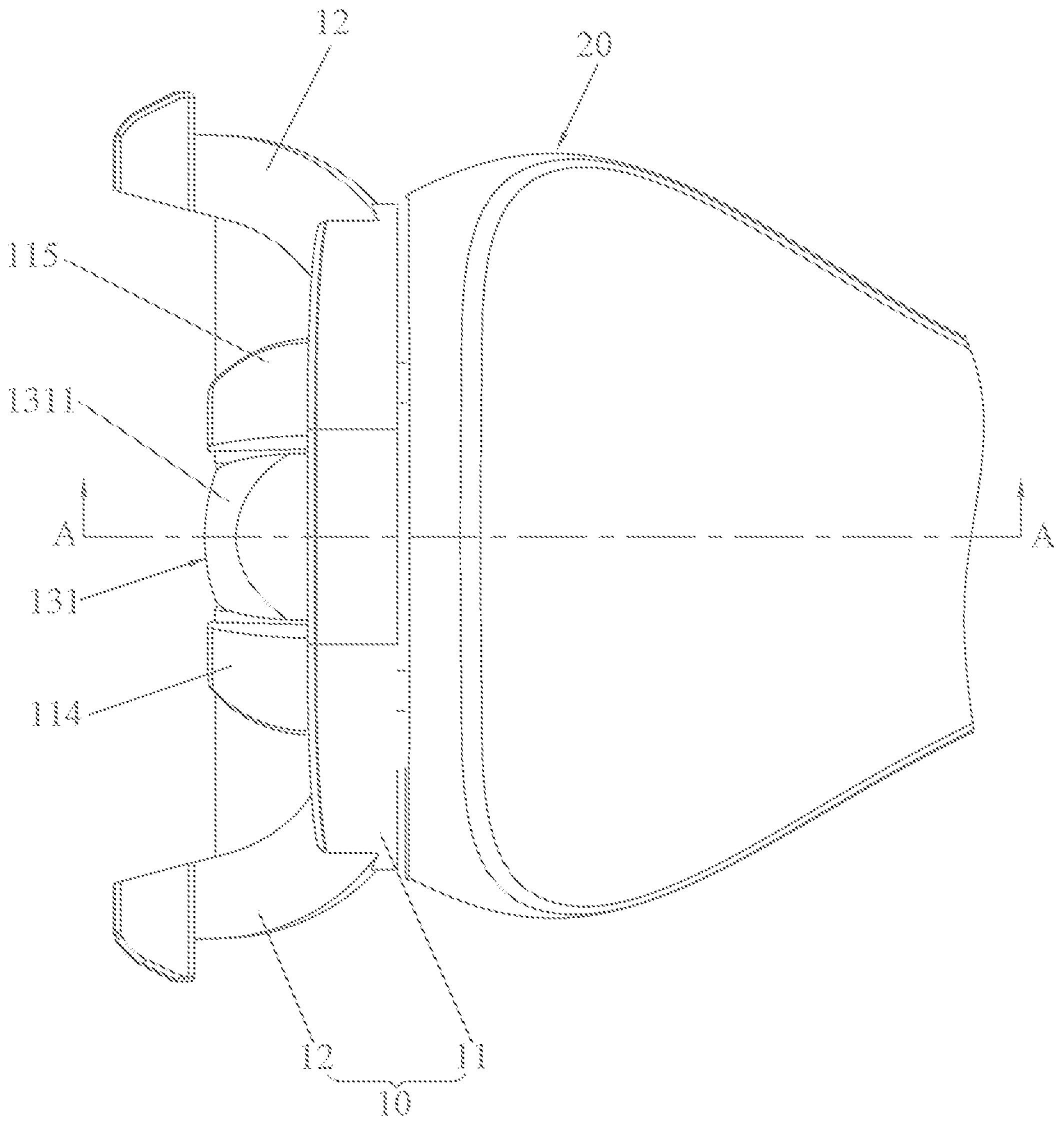
FIG. 1 is a plan view showing that an interconnecting member and a handle are combined together, in which partial structure of a handle is hidden, according to an embodiment of the present invention.
Figure 2:
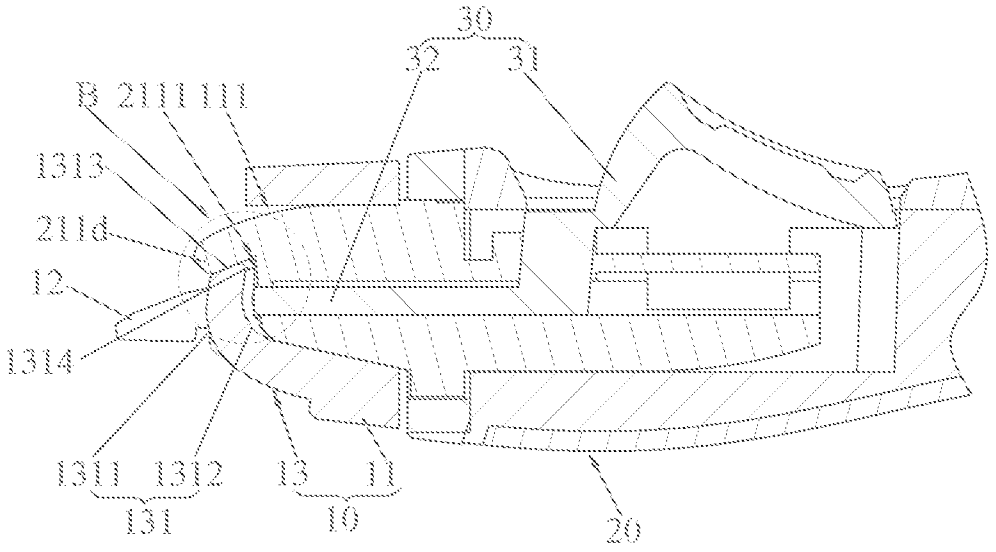
FIG. 2 is a cross-sectional view taken along a line A-A in FIG. 1.

Referring to FIGS. 1 and 2, the interconnecting member 10 of the present application is inserted into the handle 20 to facilitate the assembly and disassembly between the interconnecting member 10 and the handle 20. In order to facilitate the disassembly between the interconnecting member 10 and the handle 20, the handle 20 is provided with an unlocking operating member 30, but it is not limited to it.

Figure 3:
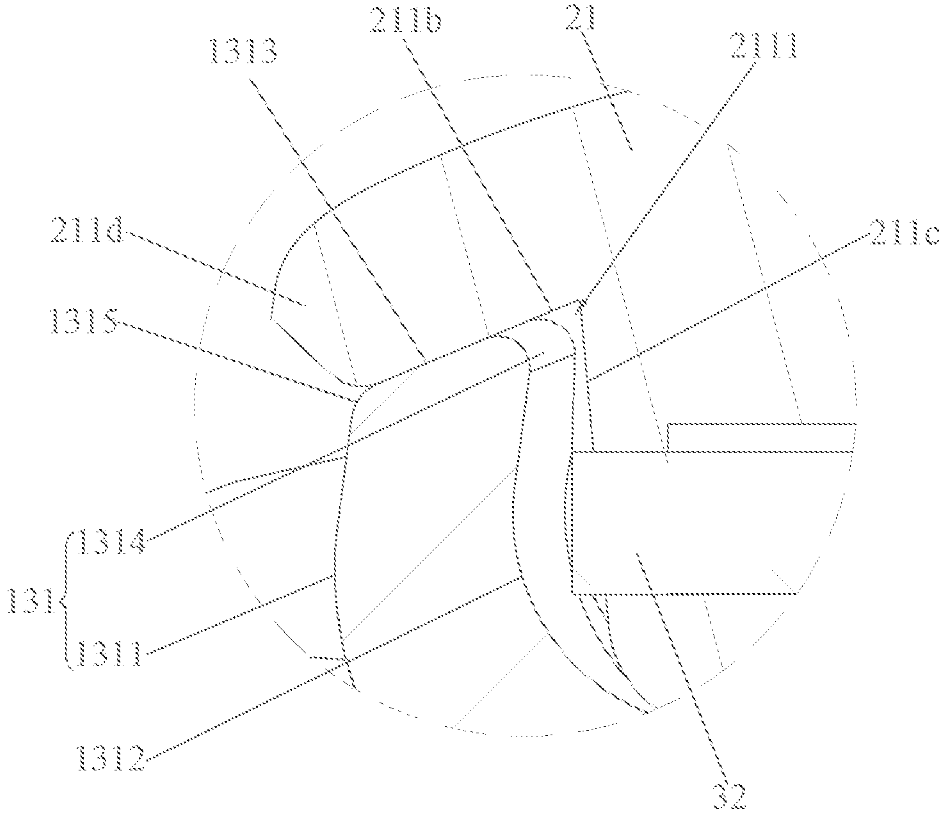
FIG. 3 is an enlarged view of section B in FIG. 2.
Figure 4:
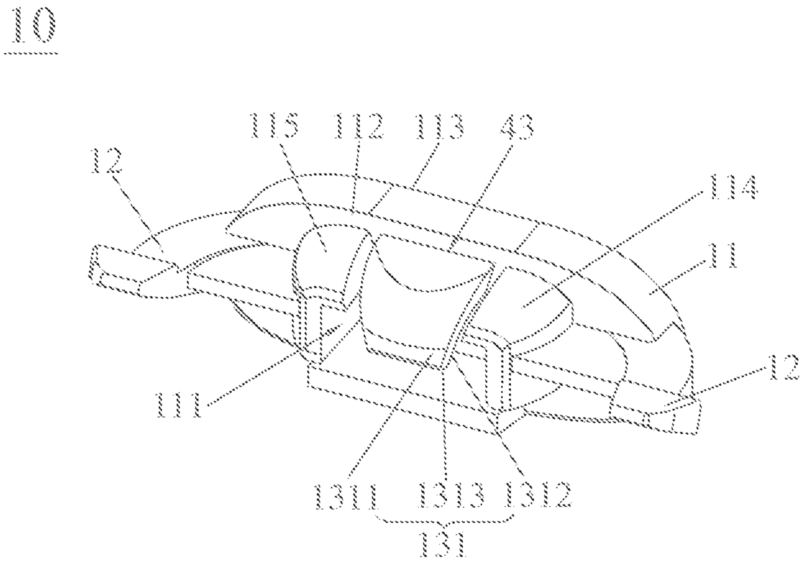
FIG. 4 is a perspective view of the interconnecting member according to an embodiment of the present invention.
Figure 5:
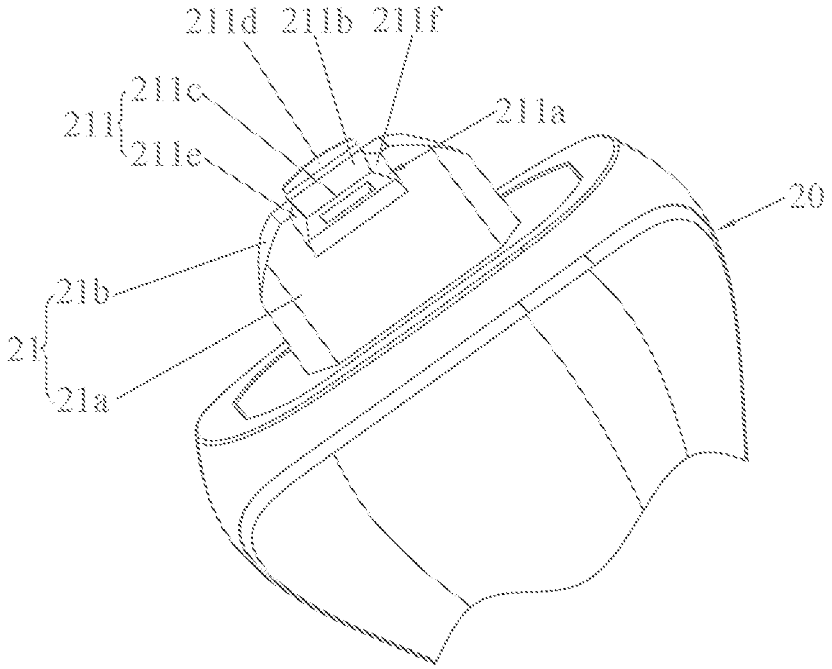
FIG. 5 is a perspective view of partial structure of the handle, according to an embodiment of the present invention.
Figure 6:
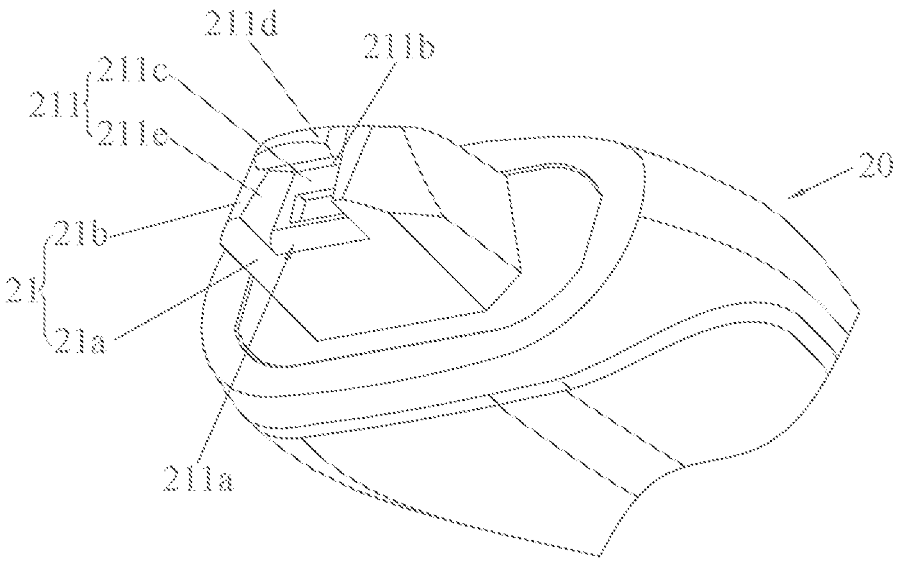
FIG. 6 is a perspective view of the handle in FIG. 5 from another angle.

Referring to FIGS. 2-4, the interconnecting member 10 includes a housing 11, pivoting support arms 12 extending upwards from left and right sides of the housing 11 respectively, and a resilient engaging arm 13 extending upward from the front side of the housing 11. The housing 11 is provided with a receiving cavity 111 inside, and the receiving cavity 111 penetrates an upper end face 112 and a lower end face 113 of the housing 11 so that the handle 20 can be inserted into the receiving cavity 111 from the lower end face 113. A free end 131 of the resilient engaging arm 13 is bent toward a rear side of the housing 11 and located in the receiving cavity 111. Specifically, the free end 131 of the resilient engaging arm 13 has an upper surface 1311, a lower surface 1312, and an inclined surface 1313 connected between the upper surface 1311 and the lower surface 1312 and formed on a rear side of the free end 131. The inclined surface 1313 is inclined forward from bottom to top of the free end 131. On the one hand, it is convenient for an inserting portion 21 of the handle 20 described below to smoothly pass through an intersection 1314 of the inclined surface 1313 and the lower surface 1312 and then abut against the inclined surface 1313 while the inserting portion 21 inserts into the receiving cavity 111. On the other hand, the inclined surface 1313 is in contact with a surface of the inserting portion 21, so that the inclined surface 1313 stops the inserting portion 21 from being pulling-out, thereby effectively preventing accidentally disengage the inserting portion 21 from the free end 131 of the resilient engaging arm 13. Specifically, the intersection 1314 between the inclined surface 1313 and the lower surface 1312 and an intersection 1315 between the inclined surface 1313 and the upper surface 1311 are arc-shaped to realize a smooth transition. Therefore, while the inserting portion 21 inserts into the receiving cavity 111, the inserting portion 21 can smoothly pass the intersection 1314 between the inclined surface 1313 and the lower surface 1312, and then abuts against the inclined surface 1313. By means of the intersection 1315 between the inclined surface 1313 and the upper surface 1311, the upper surface 1311 will not obstruct the surface contact between the inclined surface 1313 and the inserting portion 21, thereby further ensuring the reliability of the surface contact between the inclined surface 1313 and the inserting portion 21. More specifically, the upper surface 1311 and the lower surface 1312 are arcuate surfaces, and the arc diameter of the upper surface 1311 is greater than the arc diameter of the lower surface 1312, so that the free end 131 forms the convex arc structure described above, but it is not limited thereto. Understandably, according to actual needs, the intersection 1314 between the inclined surface 1313 and the lower surface 1312 or the intersection 1315 between the inclined surface 1313 and the upper surface 1311 is arc-shaped to realize a smooth transition, so it is not limited thereto.

Referring to FIGS. 1 and 4 again, the housing 11 is extended upward to from a left surrounding arm 114 and a right surrounding arm 115, respectively. Specifically, the left surrounding arm 114 surrounds the receiving cavity 111 on the left side of the housing 11, and the right surrounding arm 115 surrounds the receiving cavity 111 on the right side of the housing 11. The resilient engaging arm 13 surrounds the receiving cavity 111 on the front side of the housing 11 and is spaced apart between the left surrounding arm 114 and the right surrounding arm 115. In this way, the receiving cavity 111 forms a flat and narrow cavity, so that the inserting portion 21 fits better with the receiving cavity 111. Specifically, the pivoting support arm 12 on the left side of the housing 11 is arranged on the left side of the left surrounding arm 114 at intervals, and the pivoting support arm 12 on the right side of the housing 11 is arranged on the right side of the right surrounding arm 115 at intervals. Therefore, the razor head assembled on the pivoting support arms 12 will not interfere with the left surrounding arm 114 and the right surrounding arm 115 respectively during pivoting, thereby ensuring the reliability of the razor head pivoting.

As shown in FIGS. 1-2 and 5-6, the handle 20 is provided with the inserting portion 21 matched with the receiving cavity 111, and the inserting portion 21 is provided with an engaging groove 211. A notch 211*a* of the engaging groove 211 is formed in a front surface 21*a* and an upper surface 21*b* of the inserting portion 21, and a rear groove wall 211*b* of the engaging groove 211 is inclined forward from bottom to top of the handle 20, such that the rear groove wall 211*b* matches the inclination of the inclined surface 1313 and abuts against the inclined surface 1313. When the rear groove wall 211*b* of the engaging groove 211 abuts against the inclined surface 1313, the intersection 1314 between the inclined surface 1313 and the lower surface 1312 is located in a space 2111 between the rear groove wall 211*b* and a lower groove wall 211*c* of the engaging groove 211, as shown in FIG. 3. Specifically, the rear groove wall 211*b* and the lower groove wall 211*c* of the engaging groove 211 are both planes and the angle between the two is an acute angle. A left groove wall 211*e* and a right groove wall 211*f* of the engaging groove 211 are arranged obliquely from bottom to top of the handle 20 and approach each other, so that the free end 131 of the resilient engaging arm 13 is smoothly inserted into the engaging groove 211 during the insertion of the inserting portion 21 into the receiving cavity 111. Besides, the left groove wall 211*e* and the right groove wall 211 fare combined to effectively prevent the free end 131 of the resilient engaging arm 13 from swinging left and right. In order that the inserting portion 21 can easily and smoothly pass over the intersection 1314 between the inclined surface 1313 and the lower surface 1312, the rear groove wall 211*b* of the engaging groove 211 obliquely extends forward and upward to form a protruding pushing portion 211*d* having the same thickness, but it is not limited to it.

As shown in FIGS. 2 and 3, the unlocking operating member 30 includes a press part 31 slidably disposed on the handle 20 and a pushing rod 32 connected to the press part 31. The pushing rod 32 is inserted into the inserting portion 21, and the pushing rod 32 further extends into the engaging groove 211 and is located below the free end 131 of the resilient engaging arm 13, so that when a user presses the press part 31, the pushing rod 32 along with the press part 31 slides relative to the handle 20. Subsequently, the pushing rod 32 pushes the free end 131 of the resilient engaging arm 13 to generate resilient deformation, so as to disengage from the engaging groove 211 of the inserting portion 21, thereby disengaging the free end 131 of the resilient engaging arm 13 from the engaging groove 211 of the inserting portion 21. Preferably, the press part 31 and the pushing rod 32 are slidably arranged along a vertical direction of the handle 20. Thus, when the press part 31 is slid in the direction indicated by the arrow next to the press part 31 in FIG. 7*c*, the pushing rod 32 slides along with the press part 31, so the free end 131 of the resilient engaging arm 13 is pushed by the pushing rod 32 to resilientally deform in the direction indicated by the arrow C in FIG. 7*c*, thereby disengaging the free end 131 from the engaging groove 211 of the inserting portion 21 so as to remove the interconnecting member 10 from the handle 20.

Figure 7A:
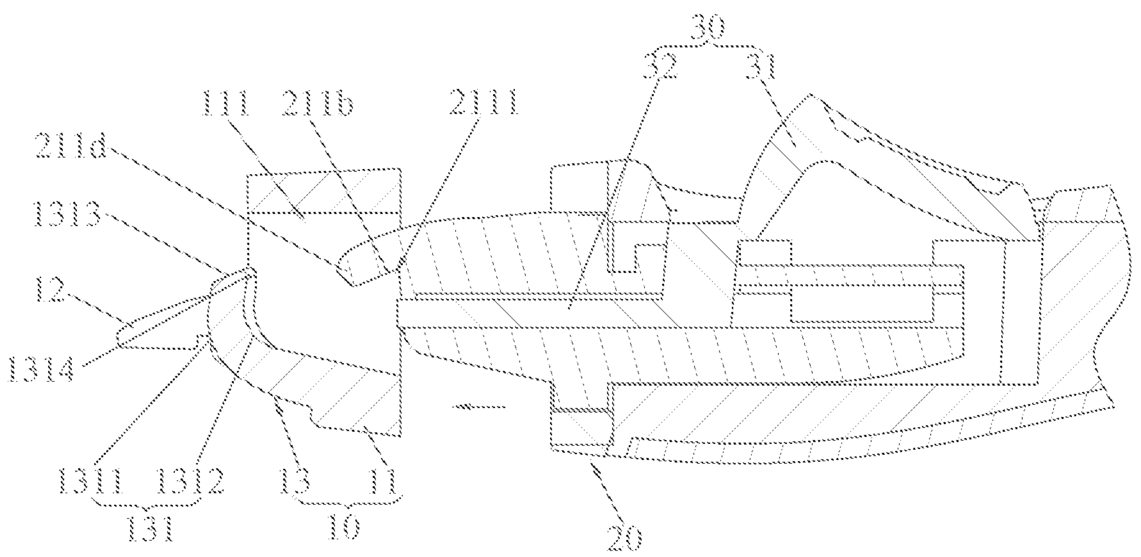
FIGS. 7*a*-7*c* are cross-sectional views showing a connecting process of the handle and the interconnecting member of the present application.
Figure 7B:
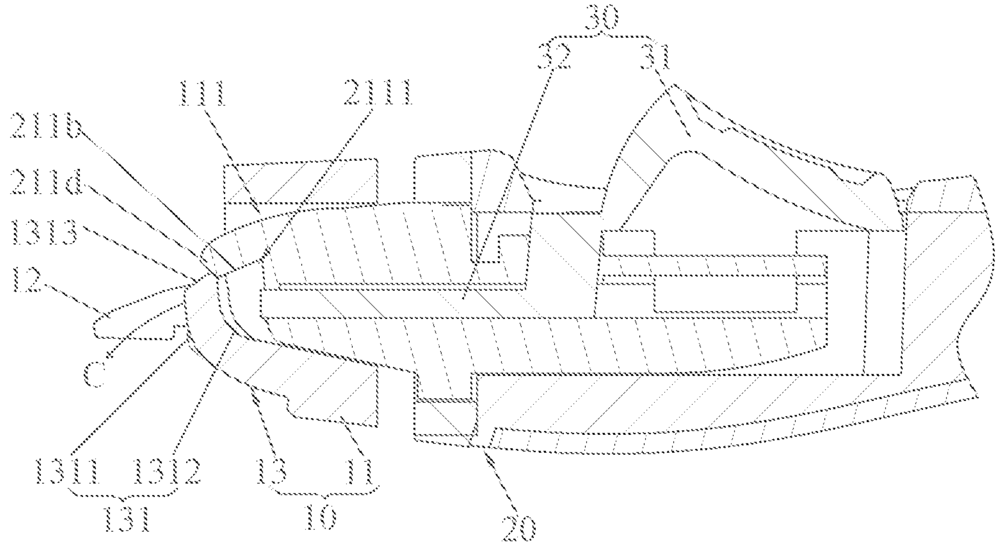
Figure 7C:
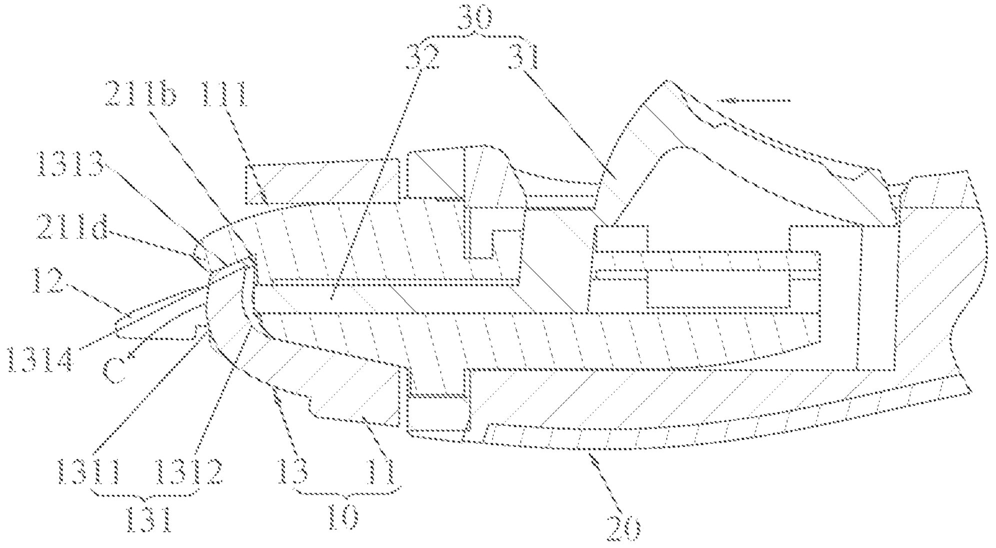

With reference to FIGS. 7*a*-7*c*, the engagement process of the handle 20 with the interconnecting member 10 is illustrated. As shown in FIG. 7*a*, the handle 20 is inserted into the receiving cavity 111 of the interconnecting member 10 in a direction indicated by the arrow beside the inserting portion 21 until an end of the protruding pushing portion 211*d* of the inserting portion 21 abuts against the intersection 1314 between the inclined surface 1313 and the lower surface 1312. When the end of the protruding pushing portion 211*d* abuts against the intersection 1314, the inserting portion 21 continues to be inserted into the receiving cavity 111 along its original direction, so that the free end 131 of the resilient engaging arm 13 is resiliently deformed in the direction indicated by the arrow C in FIG. 7*b* by the end of the protruding pushing portion 211*d*, as shown in FIG. 7*b*. As a result, the intersection 1314 will not block the end of the protruding pushing portion 211*d* of the inserting portion 21, so as to allow the end of the protruding pushing portion 211*d* to pass over the intersection 1314. Accordingly, the intersection 1314 enters the engaging groove 211 from the notch 211*a* of the engaging groove 211. Further, under the action of the elastic force of the resilient engaging arm 13, the intersection 1314 slides along the rear groove wall 211*b* of the engaging groove 211 during the insertion of the inserting portion 21 into the receiving cavity 111 until the inclined surface 1313 abuts against the rear groove wall 211*b*, as shown in FIG. 7*c*.

In comparison with the prior art, the resilient engaging arm 13 is extended upward from the front side of the housing 11, the free end 131 of the resilient engaging arm 13 is bent toward the rear side of the housing 11 and located in the receiving cavity 11. Furthermore, the free end 131 of the resilient engaging arm 13 has the upper surface 1311, the lower surface 1312, and the inclined surface 1313 connected between the upper surface 1311 and the lower surface 1312 and formed on the rear side of the free end 131, and the inclined surface 1313 is inclined forward from bottom to top of the free end 131. Therefore, while the inserting portion 21 of the handle 20 is inserted into the receiving cavity 111, the inserting portion 21 pushes the free end 131 of the resilient engaging arm 13 to resiliently deform towards the front side of the housing 11. Specifically, the protruding pushing portion 211*d* of the inserting portion 21 pushes the free end 131 of the resilient engaging arm 13 to resiliently deform towards the front side of the housing 11, so that the rear groove wall 211*b* of the engaging groove 211 smoothly passes over the intersection 1314 of the inclined surface 1313 and the lower surface 1312 and is in surface-to-surface contact with the inclined surface 1313. As a result, the inserting portion 21 is reliably clamped between the inclined surface 1313 and the corresponding cavity wall of the receiving cavity 111, and the inclined surface 1313 of the free end 131 is in surface-to-surface contact with the inserting portion 21. Therefore, the interconnecting member 10 is connected to the handle 20 by means of one resilient engaging arm 13 extending from one side of the housing 11. Consequently, the razor can simplify the structure, and the single-point engagement between the handle 20 and the interconnecting member 10 can be realized under the premise of ensuring the reliable engagement of the handle 20 and the interconnecting member 10.

Notably, if the above-mentioned resilient engaging arm 13 is formed by extending upward from the rear side of the housing 10, the free end 131 of the resilient engaging arm 13 will be bent toward the front side of the housing 10 and located in the receiving cavity 111, so it is not limited to the above-mentioned embodiment. When the resilient engaging arm 13 extends upward from the rear side of the housing 10, the notch 211*a* of the engaging groove 211 is formed on a rear surface and the upper surface 21*b* of the inserting portion 21. A front groove wall of the engaging groove 211 is inclined rearwards from bottom to up of the handle 20, the front groove wall of the engaging groove 211 abuts against the inclined surface 1313, and the intersection 1314 between the inclined surface 1313 and the lower surface 1312 is located in a space between the front groove wall and the lower groove wall 211*c* of the engaging groove 211.

Notably, when the razor shaves beard downward, the side of the interconnecting member 10 facing the skin is referred to as the front side, and the side of the interconnecting member 10 away from the skin is referred to as the rear side. At this time, the side of the interconnecting member 10 on the left side is referred to as the left side, and the side of the interconnecting member 10 on the right side is referred to as the right side. And, the side of the interconnecting member 10 on the upper side is referred to as the upper end of the interconnecting member 10, and the side of the interconnecting member 10 on the lower side is referred to as the lower end of the interconnecting member 10.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A razor, comprising an interconnecting member and a handle connected with the interconnecting member, when in use, a side of the interconnecting member facing skin being referred as a front side, and a side of the interconnecting member opposite the skin being referring to a rear side;

the interconnecting member comprising a housing and pivoting support arms extending upwards from left and right sides of the housing respectively, the housing being provided with a receiving cavity therein, the receiving cavity penetrating through an upper end face to a lower end face of the housing, wherein the interconnecting member further comprises a resilient engaging arm extending upwards from a front side of the housing, a free end of the resilient engaging arm is bent towards a rear side of the housing, the free end of the resilient engaging arm has an upper surface, a lower surface, and an inclined surface connected between the upper surface and the lower surface and formed on a rear side of the free end, and the inclined surface is inclined forward from bottom to top of the free end;

the handle being provided with an inserting portion matched with the receiving cavity, wherein the inserting portion is provided with an engaging groove, a notch of the engaging groove is formed in a front surface and an upper surface of the inserting portion, a rear groove wall of the engaging groove is inclined forward from bottom to top of the handle and capable of abutting against the inclined surface, and the intersection between the inclined surface and the lower surface is located in a space between the rear groove wall and a lower groove wall of the engaging groove.

2. The razor according to claim 1, wherein an intersection between the inclined surface and the lower surface and an intersection between the inclined surface and the upper surface are arc-shaped to realize a smooth transition.

3. The razor according to claim 1, wherein each of the upper and lower surfaces is an arcuate surface.

4. The razor according to claim 3, wherein the housing is extended upward to from a left surrounding arm and a right surrounding arm, respectively, the left surrounding arm surrounds the receiving cavity on the left side of the housing, the right surrounding arm surrounds the receiving cavity on the right side of the housing, and the resilient engaging arm surrounds the receiving cavity on the front side of the housing and is spaced apart between the left surrounding arm and the right surrounding arm.

5. The razor according to claim 4, wherein the pivoting support arm on the left side of the housing is arranged on a left side of the left surrounding arm at intervals, and the pivoting support arm on the right side of the housing is arranged on a right side of the right surrounding arm at intervals.

6. The razor according to claim 1, wherein the rear groove wall of the engaging groove obliquely extends forward and upward to form a protruding pushing portion having the same, or increasing, or decreasing thickness.

7. The razor according to claim 1, wherein the rear groove wall and the lower groove wall of the engaging groove are both planes, the angle between the two planes is an acute angle, and a left groove wall and a right groove wall of the engaging groove are arranged obliquely from bottom to top of the handle and approach each other.

8. A razor, comprising an interconnecting member and a handle connected with an interconnecting member, when in use, a side of the interconnecting member facing skin being referred as a front side, and a side of the interconnecting member opposite the skin being referring to a rear side:

the interconnecting member comprising a housing and pivoting support arms extending upwards from left and right sides of the housing respectively, the housing being provided with a receiving cavity therein, the receiving cavity penetrating through an upper end face to a lower end face of the housing, wherein the interconnecting member further comprises a resilient engaging arm extending upwards from a rear side of the housing, a free end of the resilient engaging arm is bent towards a front side of the housing, the free end of the resilient engaging arm has an upper surface, a lower surface and an inclined surface connected between the upper surface and the lower surface and formed on a front side of the free end, and the inclined surface is inclined rearwards from bottom to top of the free end;

the handle being provided with an inserting portion matched with the receiving cavity, wherein the inserting portion is provided with an engaging groove, a notch of the engaging groove is formed in a rear surface and an upper surface of the inserting portion, a front groove wall of the engaging groove is inclined rearwards from bottom to top of the handle and capable of abutting against the inclined surface, and the intersection between the inclined surface and the lower surface is located in a space between the front groove wall and a lower groove wall of the engaging groove.

* * * * *